Oct. 27, 1970 C. NEWSTEAD 3,535,944

BRAKE ACTUATORS

Filed Dec. 5, 1968 7 Sheets-Sheet 2

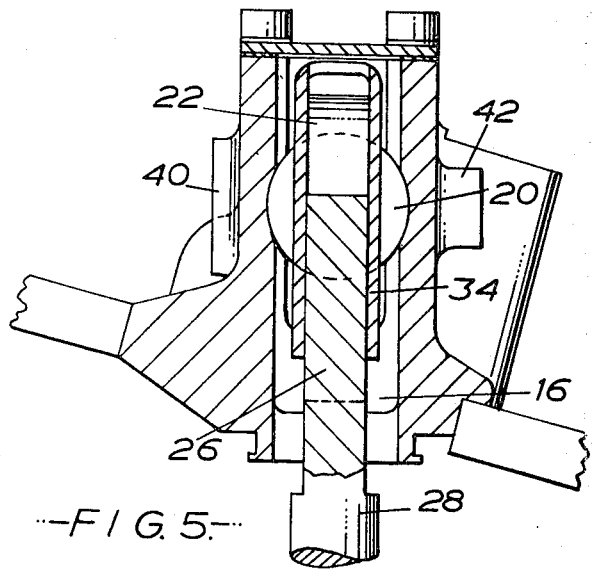
-FIG. 5.-
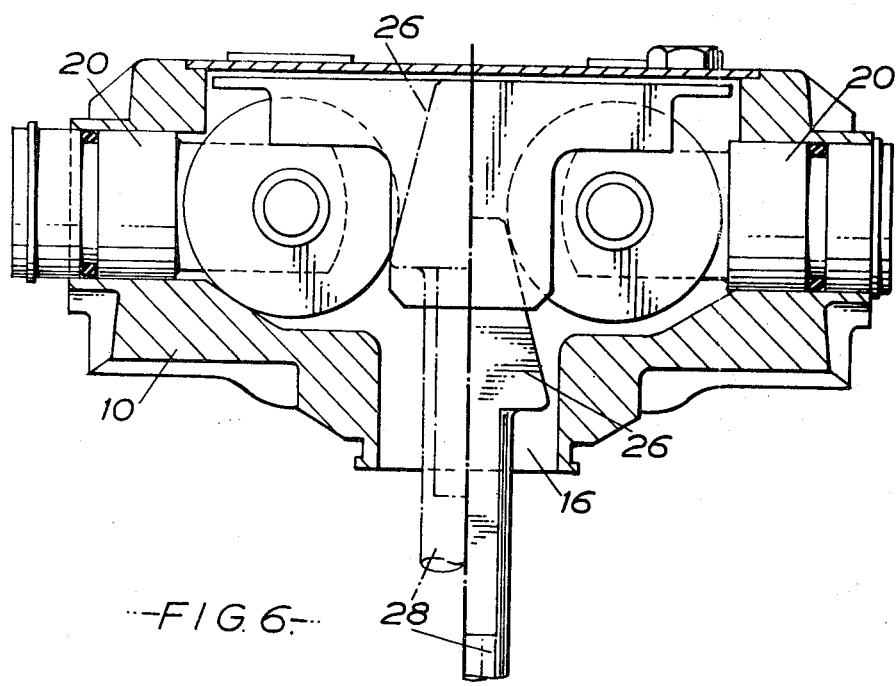
-FIG. 6.-

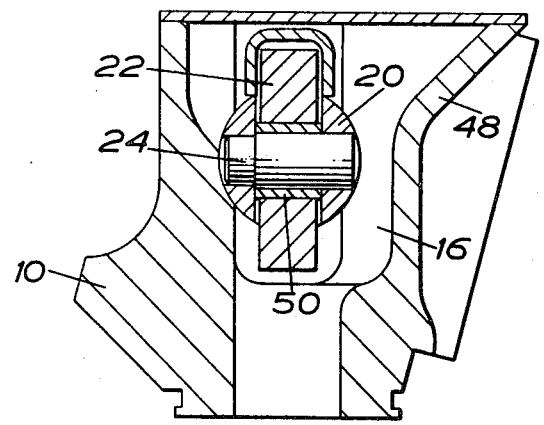
-FIG. 7.-
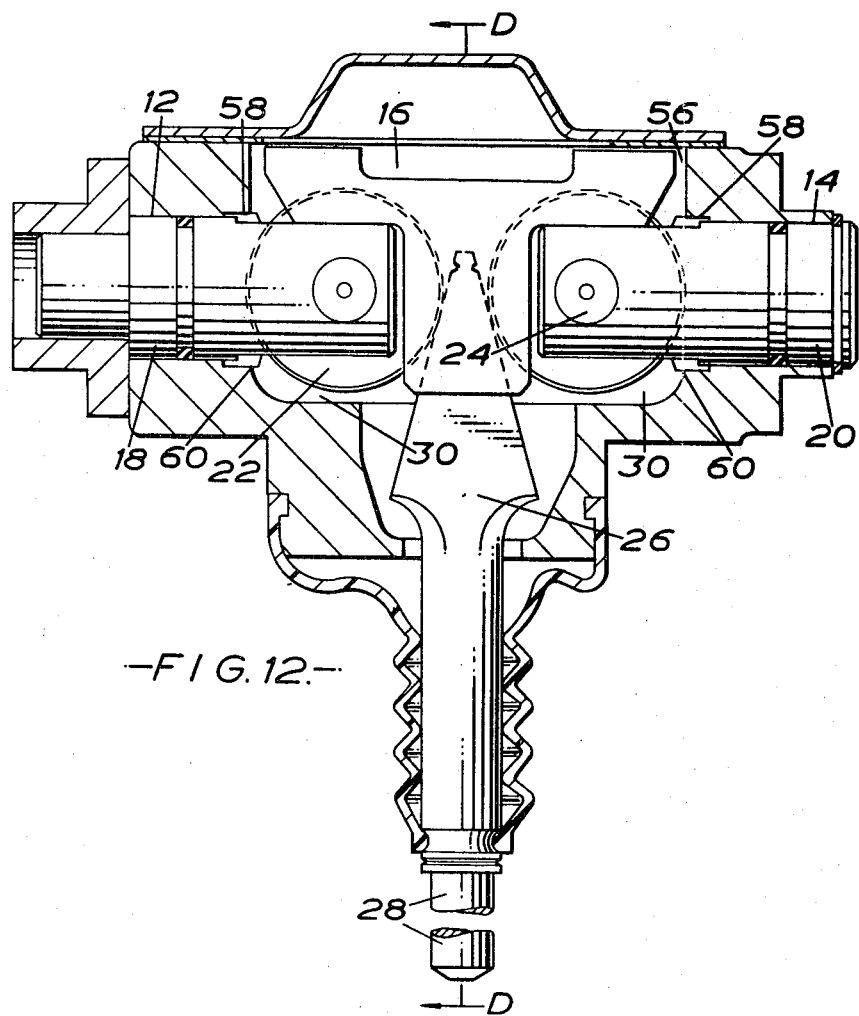
-FIG. 12.-

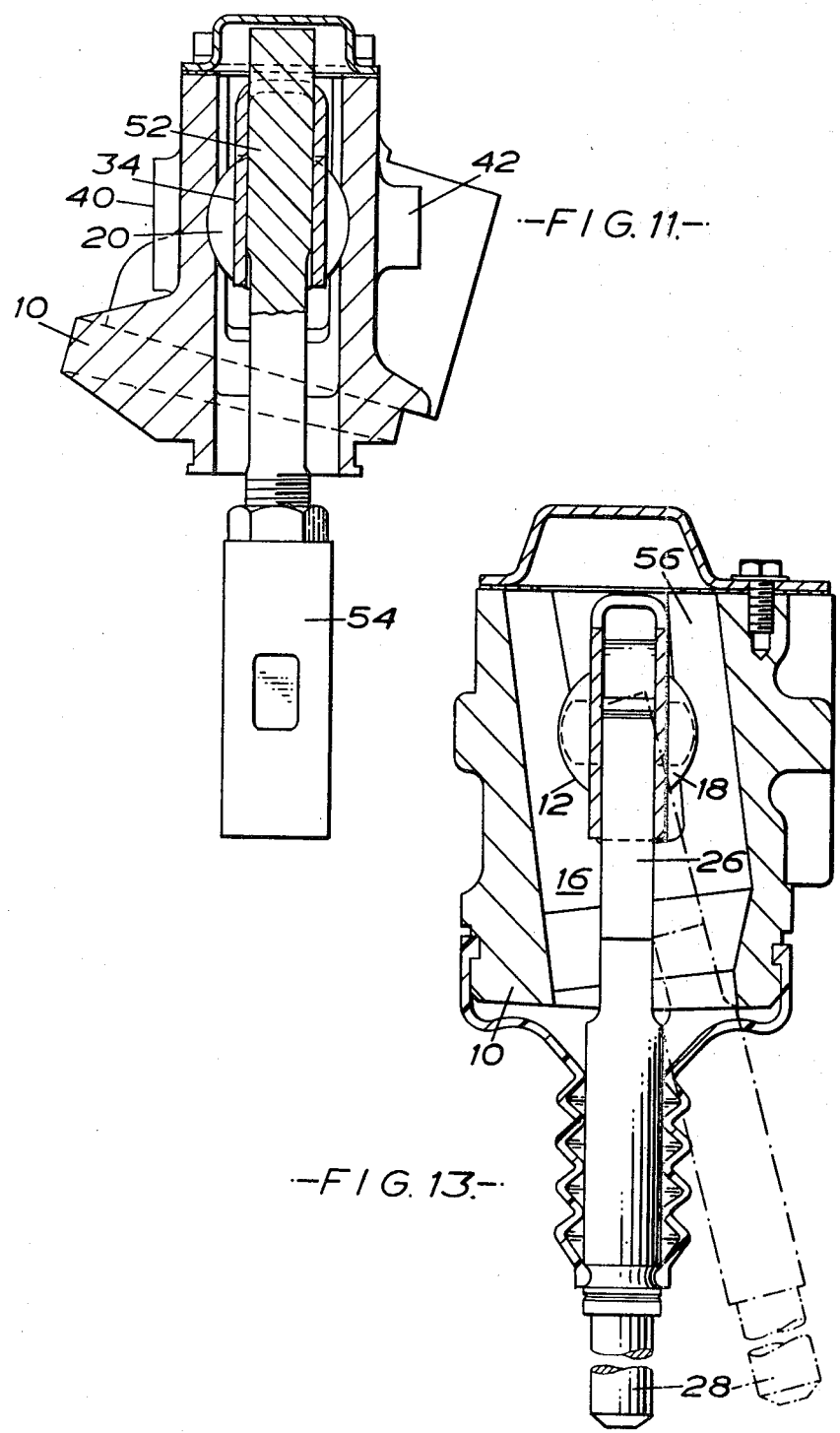

United States Patent Office 3,535,944
Patented Oct. 27, 1970

3,535,944
BRAKE ACTUATORS
Charles Newstead, Walsall, England, assignor to Girling Limited, Birmingham, England, a British company
Filed Dec. 5, 1968, Ser. No. 781,366
Claims priority, application Great Britain, Dec. 9, 1967, 56,084/67
Int. Cl. F16h 25/08
U.S. Cl. 74—110  13 Claims

ABSTRACT OF THE DISCLOSURE

The invention concerns a vehicle brake actuator or expander of the type in which a pair of opposed, aligned tappets or plungers arranged in a housing are moved away from one another in a brake actuating movement by means of a wedge member situated between them and itself displaceable, consequent upon depression of the vehicle brake pedal, in a direction generally transverse to the common axis of the tappets. In such a brake actuator, the invention provides each tappet with a roller by means of which the tappet bears on the wedge member, and the roller, which itself is guided in a slot formed in the housing, is of greater diameter than the tappet, thus ensuring good control and stability of the movement imparted to the tappets by the wedge member. As a further contribution to control and stability, the tappet bores in the housing are conveniently continued inwards beyond the roller guiding slots, thereby enabling each tappet to be guided over a major portion of its length.

---

This invention concerns vehicle brake actuators and relates more particularly to a so-called wedge-type actuator or expander.

In general, wedge-type actuators comprise a pair of opposed aligned plungers or tappets arranged to be movable towards and away from one another and to act during their spreading movement on braking elements, usually in the form of brake shoes. Intermediate the plungers there is arranged a actuating member which is customarily a wedge member displaceable in a direction normal to the plunger axes for causing a spreading movement of the plungers.

For use in brakes intended to be incorporated in heavy vehicles, it has already been proposed to secure a roller to the inner end of each plunger or tappet and to arrange for the rollers to bear on the wedge member, thus improving the thrust transmission between the wedge member and the tappets.

According to the present invention, a brake actuator comprises a housing formed with an internal chamber and a pair of aligned bores opening from opposite sides of said chamber, a plunger or tappet in each bore, a wedge member displaceable between the inner end of the tappets, the inner end of each tappet being slotted and a roller mounted in the slotted inner end of each tappet, said wedge member bearing on said roller and said roller being of greater diameter than said tappet, and the inner end region of each bore being slotted to accommodate spreading movement of said roller responsive to a brake actuating displacement of said wedge member.

The provision of rollers of greater diameter than the tappets provides a significant improvement in the degree of thrust transmission between the wedge member and the tappet and facilitates a stable and graduated control of the tappet movement. The stability of the arrangement is further improved by the location of the rollers in the slots formed at the inner ends of the tappets, and at the same time the tappet bore may be continued inwardly beyond the outer ends of the rollers slots, thus providing support for the tappet over a major portion of its length.

Preferably the arrangement is such that at least one of the tappet bores continues inwardly into the aforementioned chamber beyond the position occupied by the roller axis in the normal rest position of the rollers.

Conveniently, a channel section cage of generally T-shaped configuration may be positioned within the internal chamber with the stem of the T embracing the wedge member and the head of the T engaging the rollers to maintain the rollers and wedge member in coplanar relation and to guide their relative movement within the housing.

The invention will be described further, by way of example, with reference to the accompanying drawings, in which:

FIG. 5 is a transverse section taken on the line B—B of FIG. 3;

FIG. 6 is a sectional elevation of another brake actuator embodying the invention;

FIGS. 7 and 8 are sectional details of the embodiment of FIG. 6 illustrating the insertion of the rollers into the housing;

FIG. 11 is a transverse section taken on the line C—C of FIG. 9;

FIG. 12 is a sectional elevation of a still further embodiment of the invention;

FIG. 13 is a transverse section taken on the line D—D of FIG. 12; and

Throughout the following description and in the drawings like reference numerals are used wherever appropriate to indicate like parts.

Figure 1:
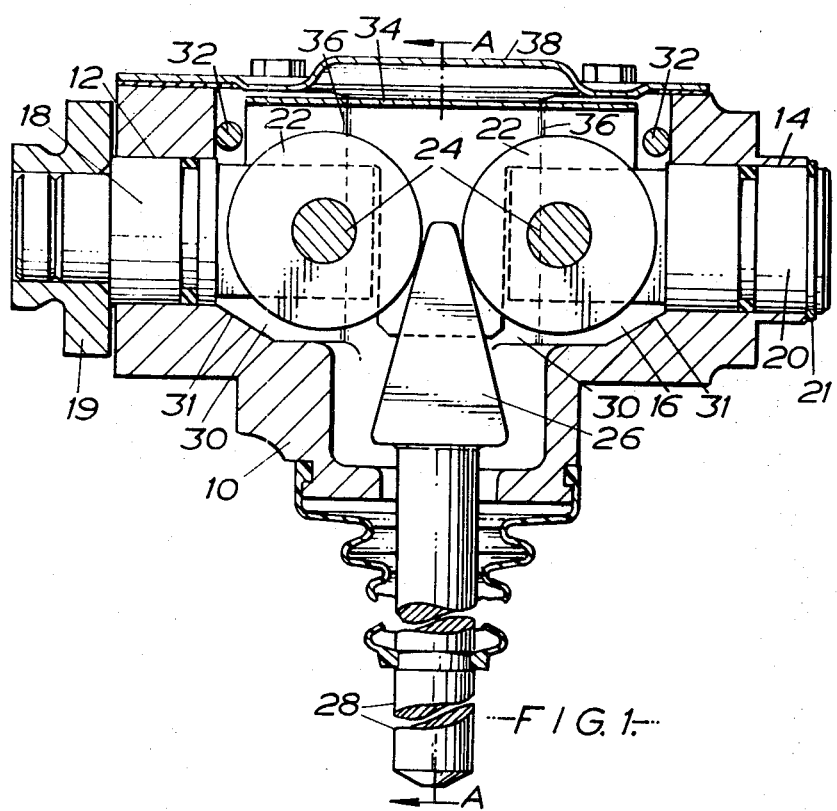
FIG. 1 is a sectional elevation of one brake actuator embodying the invention.
Figure 2:
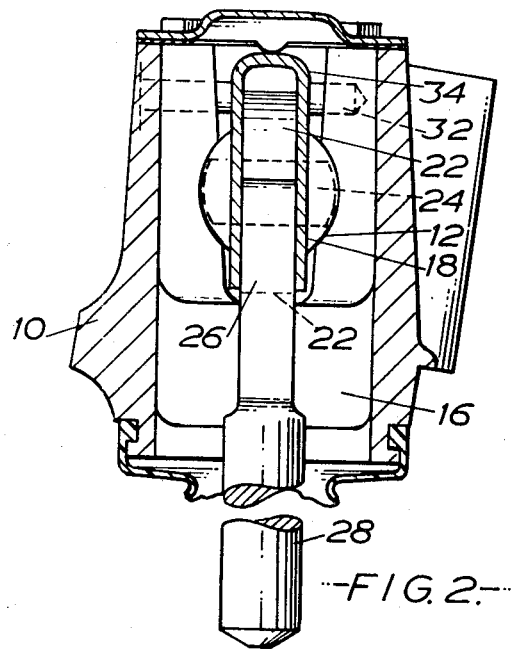
FIG. 2 is a transverse section taken on the line A—A of FIG. 1.

In the actuator shown in FIGS. 1 and 2 of the drawings a housing 10 adapted for securing to a fixed back plate of a vehicle wheel mounted (not shown) is formed with a pair of axially aligned bores 12 and 14 and with a chamber 16 situated centrally between the bores 12 and 14. Within the bores 12 and 14 are arranged plungers or tappets respectively denoted 18 and 20 and the inner ends of the tappets project into the chamber 16. To the inner end region of each tappet, a roller 22 is secured by means of a pin 24 and centrally of the chamber 16, the rollers 22 normally bear against a wedge member 26 carried at the free inner end of a push rod 28. The push rod 28 may be actuated in any convenient manner, as by a cam or lever system or by a hydraulic piston and the resulting inward movement of the wedge member 26 between the rollers 22 spreads the latter apart to displace the tappets 18 and 20 outwardly of their respective bores in the housing 10. The tappet movement in turn, when the actuator is mounted within a brake, displaces braking elements such as brake shoes towards a co-operating braking surface and it is the action of the usual brake shoe return springs which maintains the rollers 22 bearing against the wedge member 26 when the push rod 28 is withdrawn.

It will be noted that the rollers 22 are of a larger diameter than the tappets 18 and 20, a feature which contributes towards operating stability of the illustrated brake actuator by enabling the wedge member 22 to exert a fine control over spreading movements of the tappets. At the same time, to permit proper movement of the rollers 22, the housing 10 shown in the drawings is slotted as at 30, the end of each slot remote from the chamber 16 terminating in an axially inwardly sloping shoulder 31, adjacent the junction of which with the remainder of the respective tappet bore there is mounted a pin 32 co-operating with the aforementioned inclined shoulder to constitute a stop limiting further movement of the roller 22.

Within the chamber 16 is arranged a cage 34 which is shown in FIG. 1 as having a substantially T-shaped configuration and which will be observed from FIG. 2 to be channel shaped in cross section. The cage 34 serves to enclose the rollers and the wedge member 26 in coplanar relation and to ensure that in any relative tilting movements of the housing 10 and push rod 28, the rollers and the wedge member move as one unit.

It will be appreciated that the provision of the slots to accommodate the rollers 22 merely represents the circumferential interruption of the tappet bores 12 and 14 and that these bores are otherwise extended at their inner ends well into the chamber 16 as indicated by internal shoulders 36 formed within the housing. A maximum degree of support is thus afforded to the two tappets. It is a feature of the invention that at least one of the tappet bores, shown as being the bore 12 in FIG. 1, extends at its inner end inwardly beyond the axis of the roller pin 24 in the normal rest position of the roller.

In the assembly of the actuator described with reference to FIGS. 1 and 2, the housing having been formed with one side of the chamber 16 open, a cover plate 38 for that open side is removed. Referring firstly to the right-hand tappet 20, it is to be noted that the normal rest position of this tappet is determined by a circlip 21 secured at its outer end. During initial assembly of the actuator, the circlip 21 is removed, the tappet 20 is rotated through 90° relative to the illustrated position and is then moved bodily inwards in the bore 14 to a position where the roller may be placed between the split ends of the tappet and located thereon by the pin 24. The completed tappet assembly is then rotated back through 90° and moved outwards in the bore 14 to a position where the circlip 21 can be refitted. The left-hand tappet 18 is treated in a similar manner except that its own position is determined by an end cap 19 instead of by a circlip 21. The cage 34 is arranged over the rollers and the wedge member and the cover plate 38 is secured to the housing. The cover plate 38 simultaneously serves to bias the cage 34 against the rollers and the wedge member 26 and thus prevents rattling.

Figure 3:
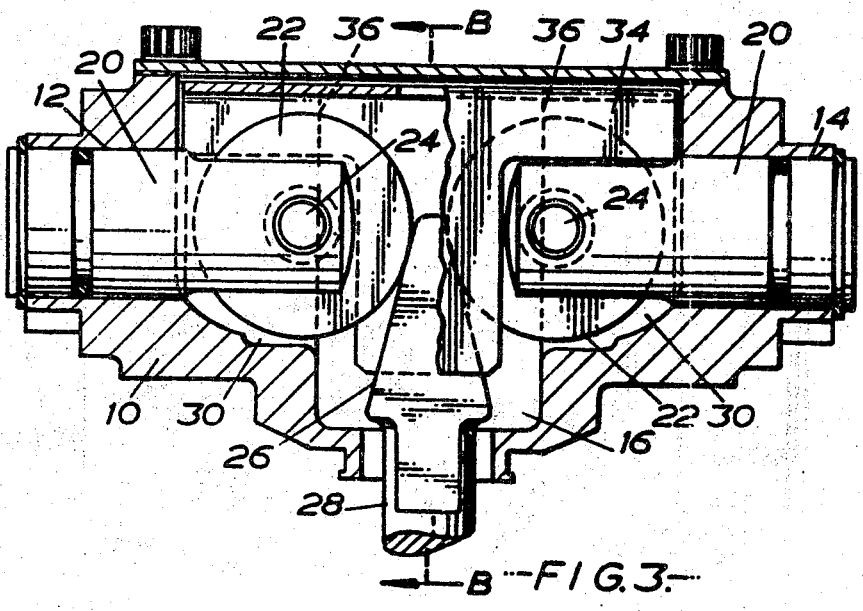
FIG. 3 is an elevation similar to that of FIG. 1 of another embodiment of the invention.
Figure 4:
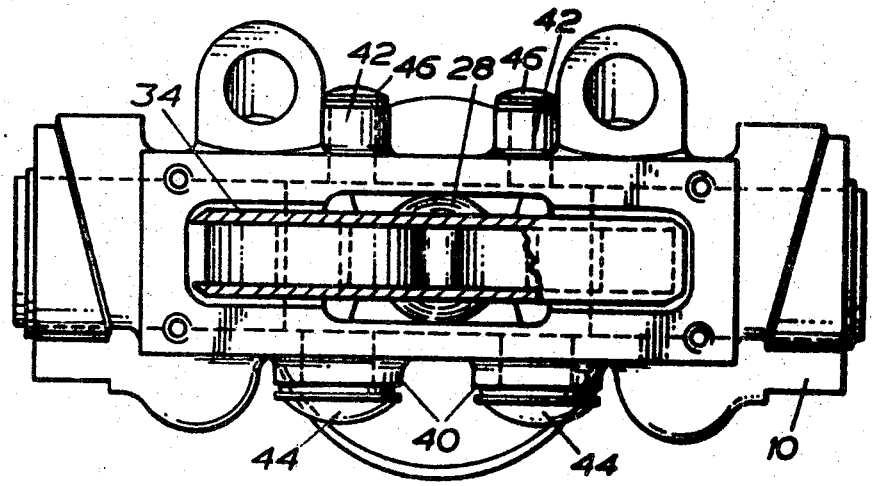
FIG. 4 is a plan view thereof, partly in section.

The brake actuator illustrated in FIGS. 3, 4 and 5 is similar to the construction already described except insofar as concerns the method of assembling the rollers to the tappets. For this purpose the housing 10 is provided with a first pair of holes 40 in its side walls which are of a sufficient diameter to receive the roller spindles 24 and with a second pair of holes 42 diametrically opposite the holes 40 for admitting into the chamber 16, a tool appropriate for assembly and dismantling of the rollers to the split inner ends of the tappets 20. The advantage of this construction is that the tappets do not need to be rotated prior to assembly. Normally the holes 40 and 42 are closed by plastic caps 44 and 46 respectively.

Figure 8:
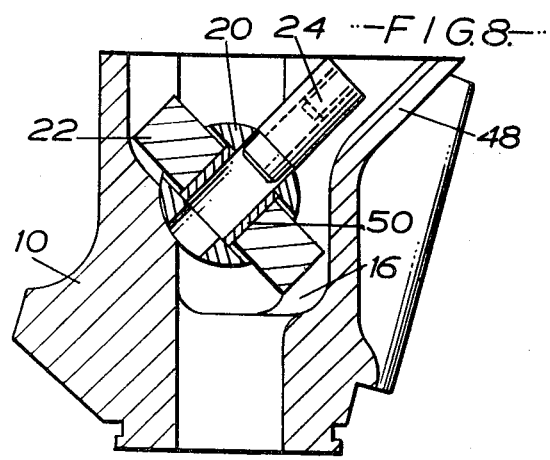

Turning now to the embodiment of the invention illustrated in FIGS. 6–8 inclusive, it will be observed that the housing 10 is provided with one side wall laterally outwardly inclined at its upper region as indicated at 48 thereby considerably enlarging the upper half of the chamber 16. In this way there is adequate room available for the rollers 22 to be tilted when they are initially introduced into the chamber 16 and fitted between the split ends of the tappets 20, as illustrated in FIG. 8. In this way only a partial rotation of the tappet is necessary as a preliminary to a fitting of the roller.

It will be noted that in the embodiment of FIGS. 6 to 8, a spacer sleeve 50 is shown as being located between the pin 24 and the roller 22 in order to prevent the tappet from binding on the roller under load.

The embodiment of the invention described with reference to FIGS. 9 to 11 inclusive is generally similar to those already discussed but illustrates the application of the invention to an actuator employing a wedge member of the puller type. This is most clearly illustrated in FIG. 9 where the wedge member 52 is shown secured to a pull rod assembly 54. It will also be noted in this embodiment of the invention that the rollers 22 are shown as mounted on an actual bearing assembly generally designated 23 and carried on the roller spindle 24.

In the embodiment of the invention illustrated in FIGS. 12 and 13, roller assembly is effected through a central opening 56 in the housing 10, the opening 56 having a width greater than the roller diameter and providing access to the chamber 16. For simplicity, the rollers 22 are mounted with running clearance on their spindles 24 and the latter are in turn located with running clearance in spindle-receiving holes in the tappets 18 and 20. Abutments 60 to limit the outward travel of the rollers 22 under the action of the wedge member 26 are provided by forming the tappet bores 12 and 14 respectively with enlarged diameter annular recesses 58 situated in each instance at the region where the slots 30 terminate, each abutment being defined by the corner edge at the junction of the recess 58 with the associated tappet bore.

Figure 14:
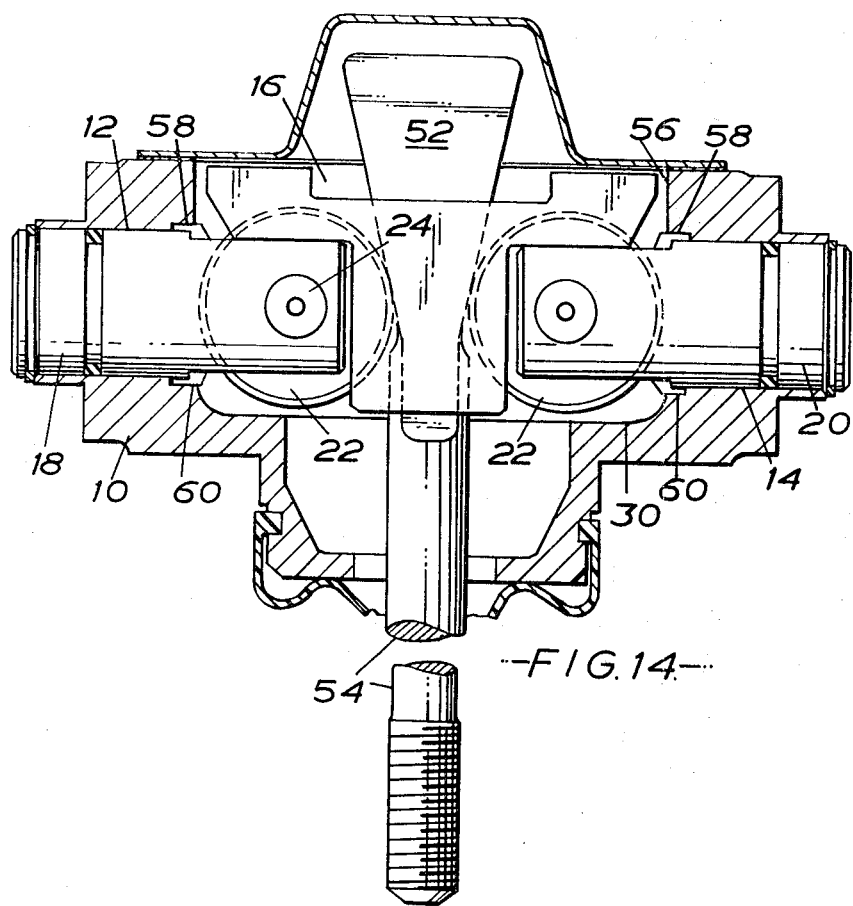
FIG. 14 is a sectional elevation of a modification of the embodiment illustrated in FIG. 12.
Figure 9:
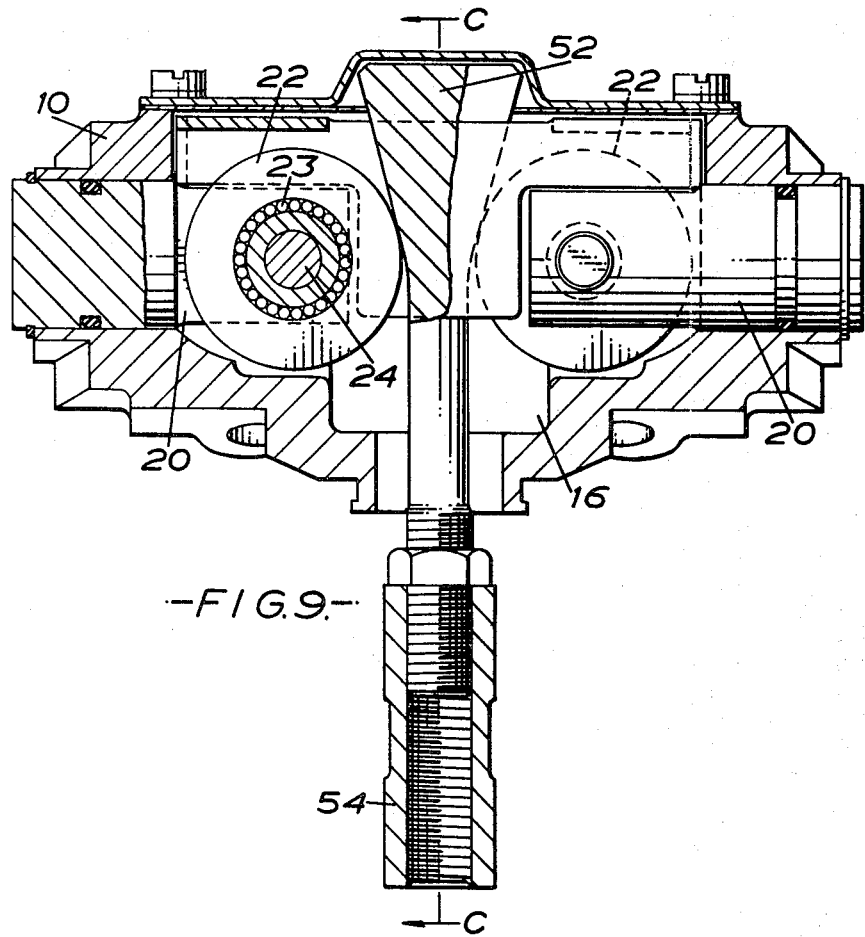
FIG. 9 is a sectional elevation of a further embodiment of the invention.
Figure 10:
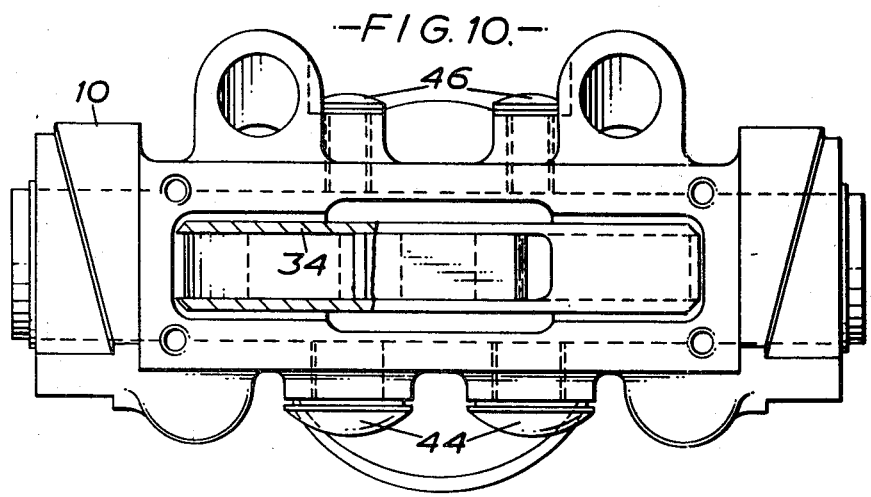
FIG. 10 is a plan view thereof, partly in section.

While the embodiment described immediately above employs a wedge member actuated by a push rod 28, the modification shown in FIG. 14 uses a pull rod assembly 54 and wedge member 52 similar to that of FIGS. 9 to 11. In all other rejects, the actuator of FIG. 14 is similar to that of FIGS. 12 and 13.

I claim:

1. A brake actuator comprising a housing formed with an internal chamber and a pair of aligned bores opening from opposite sides of said chamber, a tappet in each bore, the inner end of each tappet being slotted, a roller of greater diameter than the tappet mounted in the slotted inner end of each tappet, and a wedge member displaceable between the inner ends of the tappets, said wedge member bearing on said rollers and said housing being formed at the inner end region of each bore with a slot for accommodating the spreading movement of said rollers resulting from a brake actuating displacement of said wedge member, said bores in the housing being continued inwardly beyond said slots in order to provide support for the tappets over a major portion of their length.

2. A brake actuator as set forth in claim 1, wherein at least one of said bores continues inwardly into said chamber beyond the position occupied by the respective roller axis in the normal rest position of the roller.

3. A brake actuator as set forth in claim 1, further comprising a channel-section cage of generally T-shaped configuration positioned within said chamber with the stem of the T embracing the inner end of the wedge member and the head of the T engaging the rollers to maintain the rollers and the wedge member in co-planar relation and to guide their relative movement within the housing.

4. A brake actuator as set forth in claim 1, said housing being open at a region opposite that at which the wedge member is introduced into said chamber, and a cover plate closing the open region of the housing and acting additionally to bias the cage against the rollers.

5. A brake actuator as set forth in claim 1, wherein opposed side walls of the housing are formed with aligned holes serving to assist assembly of the rollers into said housing.

6. A brake actuator as set forth in claim 1, the end of each slot remote from said chamber terminating in a shoulder inclined towards and meeting with the associated one of said bores said actuator further comprising a pin mounted in the housing at the junction of each shoulder with said bore and cooperating with said shoulder to constitute a stop limiting outward travel of the roller in said slot.

7. A brake actuator as set forth in claim 1, wherein the rollers are mounted on bearing sleeves which in turn are mounted on roller pins.

8. A brake actuator as set forth in claim 1, wherein an upper region of said housing has one side wall laterally outwardly inclined in order to enlarge the upper part of said chamber.

9. A brake actuator as set forth in claim 1, comprising a push rod cooperating with the wedge member for displacing the same.

10. A brake actuator as set forth in claim 1, comprising a pull rod cooperating with the wedge member for displacing the same.

11. A brake actuator as set forth in claim 4, wherein the open region of said housing has a width greater than the roller diameter.

12. A brake actuator as set forth in claim 1 further comprising an abutment to limit the outward travel of each roller, said abutment being provided by forming the associated bore with an enlarged diameter annular recess situated at the outer terminal end of the slot interrupting said bore, said abutment being defined by the junction or edge between said recess and said bore.

13. A brake actuator as claimed in claim 11, wherein each roller is mounted with running clearance on a roller pin which in turn is mounted with running clearance in the housing.

References Cited
UNITED STATES PATENTS

| | | | |
|---|---|---|---|
| 1,348,851 | 8/1920 | Cook | 74—110 |
| 3,170,322 | 2/1965 | Cavanaugh | 74—110 |

WESLEY S. RATLIFF, Jr., Primary Examiner

U.S. Cl. X.R.

188—152.82